Patented June 21, 1927.

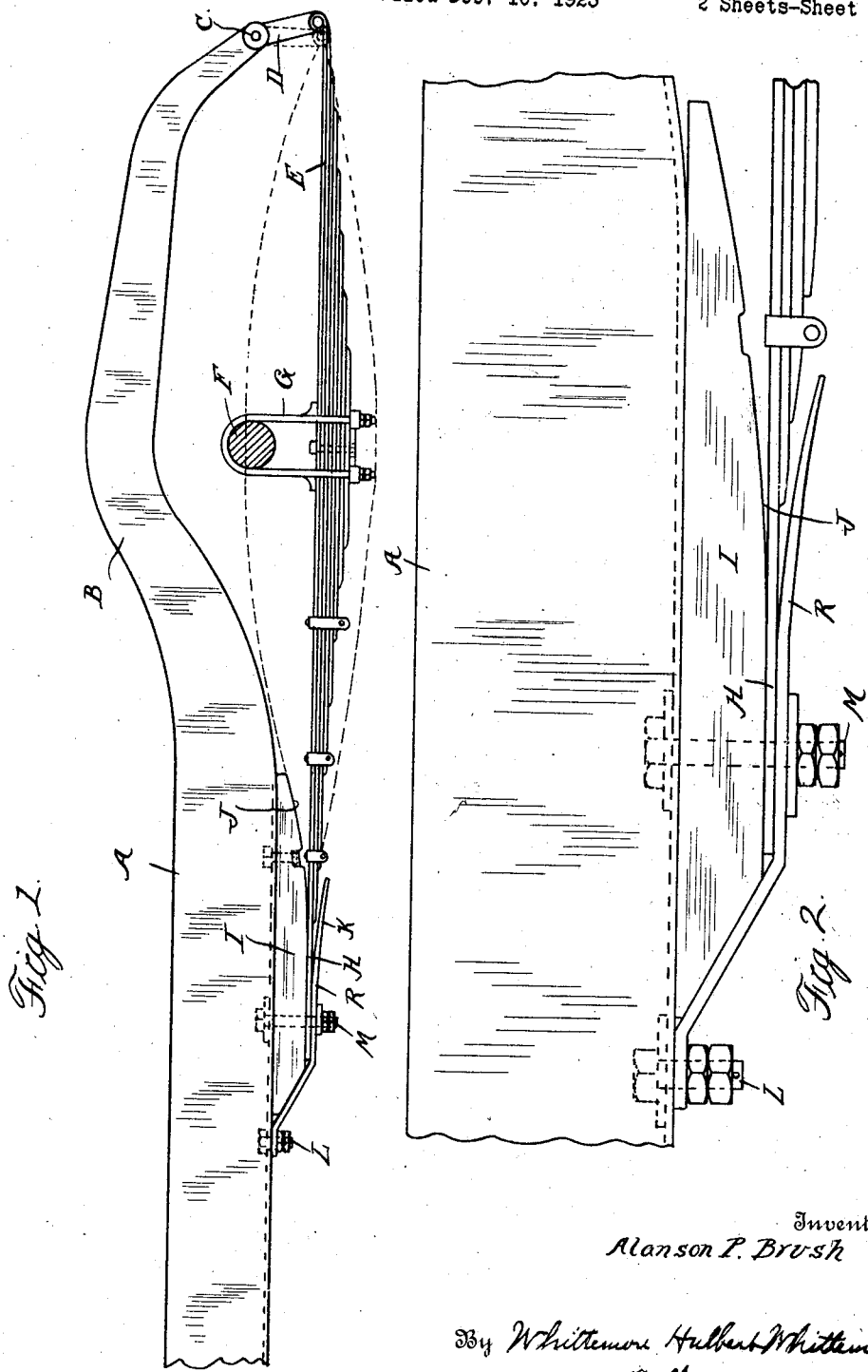

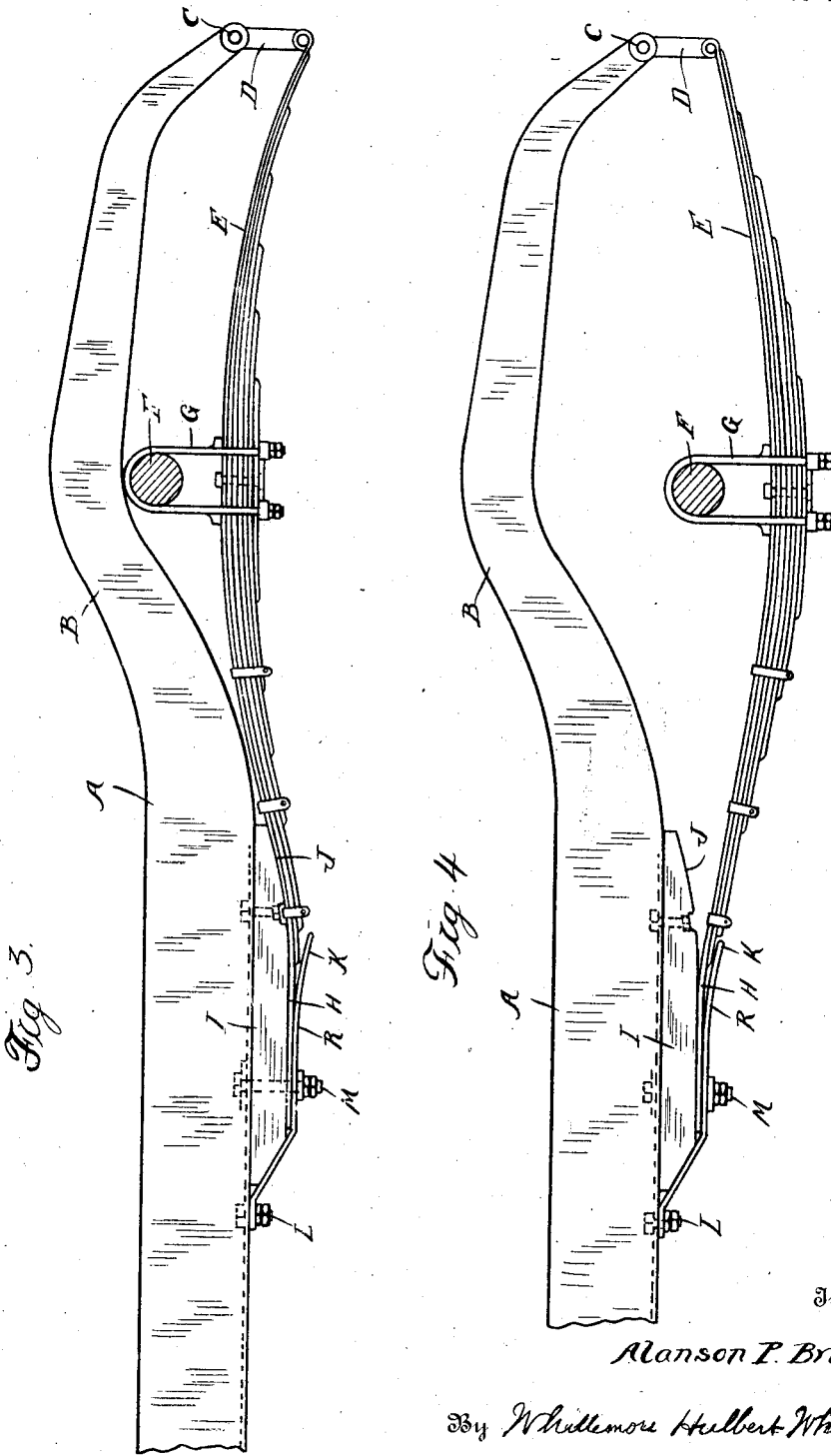

1,632,993

UNITED STATES PATENT OFFICE.

ALANSON P. BRUSH, OF DETROIT, MICHIGAN.

VEHICLE SPRING.

Application filed December 10, 1923. Serial No. 679,824.

The invention relates to vehicle springs and has more particular reference to that type in which the forward propulsion of the axle is transmitted to the frame through the spring. With this type of construction it is usual to connect the forward end of the spring to the frame by a pivotal bearing, while the rear end is connected by a shackle or equivalent means for permitting elongation or contraction of the spring when flexed.

It is the primary object of the present invention to simplify the construction by dispensing with the pivotal connection between the spring and the frame and substituting therefor a flexible extension of the spring. Such a construction without further modification would, however, be unsatisfactory, for the bending stresses in the extension of the spring would be concentrated at a point adjacent to the rigid connection, thereby greatly weakening the structure. To overcome this defect the invention consists in the construction as hereinafter set forth.

In the drawings:

Figure 1 is a side elevation of a portion of the vehicle frame showing the improved construction of spring applied thereto;

Figure 2 is an enlarged view of the forward attachment portion of the spring;

Figures 3 and 4 are diagrams showing the spring respectively under maximum deflection and maximum recoil.

A is a portion of the vehicle frame, preferably provided with an upwardly bowed rear end portion B terminating in a pivot bearing C for attachment of the shackle D connecting the rear end of the leaf spring E. This spring may be of any suitable construction, but preferably is so designed that the main leaf will be substantially straight when subjected to normal load. F is the axle suitably connected to the spring by the clip G.

The connection of the forward end of the spring to the frame is formed through the medium of an extension H of the main leaf rigidly attached to said frame. This extension is of sufficient length to permit the requisite change in angularity of the leaf under maximum deflection and recoil. Inasmuch, however, as the leaf is of uniform cross section, there will be a tendency to concentrate the bending stresses at a point adjacent to the rigid attachment. This is avoided by providing a reinforcement for the leaf, preferably a rigid bearing member I having a cammed surface J. The shape of this surface is such as to hold the deflection in each successive point in the spring safely within the elastic limit of the material. Thus the leaf may bend to the required angle without danger of overstressing any part.

The spring is further strengthened by a reinforcement for the under side thereof, limiting the bending at any one point during recoil. This, as shown, consists of a tapering spring leaf K which is secured beneath the main leaf H and is clamped therewith to the bearing I. The leaf K is preferably inclined upward at its forward end into the plane of the lower flange of the frame, being secured thereto by the bolt L. A bolt M may be used as a clamping means for securing the members K, H and I.

With the construction as described, under normal loads, the main leaf H is substantially straight and therefore the forward thrust of the axle is transmitted therethrough directly to the frame. When the spring is flexed by a downward movement of the frame, the main leaf H will be progressively conformed to the contour of the cam face J, which limits the bending at each successive point. Upon recoil of the spring, movement beyond the normal plane will be controlled by the reinforcing leaf R, which functions in a similar manner to the bearing I. Thus the pivotal connection between the spring and frame is safely dispensed with.

What I claim as my invention is:

1. The combination with a vehicle frame, of a supporting spring therefore having one end rigidly attached to said frame, and means adjacent to the point of rigid attachment for controlling the deflection of the spring within safe limits, the said means being so shaped with respect to the spring as to produce in the body portion of the spring substantially the same movement as with a pivotal connection at said point of attachment.

2. The combination with a vehicle frame, of a supporting spring therefore adapted to be substantially straight when subjected to normal load, means for rigidly attaching one end of said spring to said frame, and reinforcing means for said spring adjacent to the point of rigid attachment for limiting the deflection of said spring, the said means being so shaped with respect to the spring as to produce in the body portion of the spring substantially the same movement as with a pivotal connection at said point of attachment.

3. The combination with a vehicle frame, of a leaf spring for supporting the same having its main leaf extended, the said spring being adapted to flex as a unit, a rigid connection between said extension of the main leaf and the frame, and reinforcing means adjacent to the point of rigid connection for limiting the deflection of said main leaf safely within the elastic limit.

4. The combination with a vehicle frame, of a leaf spring for supporting the same having an extension of the main leaf thereof, the said spring being adapted to flex as a unit, means for rigidly securing the end of said main leaf extension to said frame, and a bearing adjacent to said main leaf having a cammed face for limiting the deflection of said leaf.

5. The combination with a vehicle frame, of a leaf spring for supporting the same, the main leaf of said spring being provided with a forward extension, means for rigidly securing the forward end of said extension to the vehicle frame, and a bearing extending from said point of support adjacent to said main leaf, said bearing having a cammed face for limiting the deflection of the spring, and producing in the body portion of the spring substantially the same movement as with a pivotal connection at said point of attachment.

6. The combination with a vehicle frame, of a leaf spring for supporting the same, the main leaf of said spring being provided with a forward extension, a cam block on said frame to which the forward end of said extension is attached, and a cam bearing on the opposite side of said spring, said cam bearings limiting the deflection of the spring in opposite directions to be safely within the elastic limit thereof.

7. The combination with a vehicle frame, of a leaf spring for supporting the same having an extension of the main leaf thereof, a cam block on the frame to which the forward end of said extenson is rigidly attached, and a reinforcing spring leaf rigidly attached to said main leaf and bearing block and extending upon the opposite side of the spring, said cam block and reinforcing leaf serving to limit the deflection of said main leaf safely within the elastic limit thereof.

8. The combination with a vehicle frame, of a supporting spring therefor having one end rigidly attached to said frame, a shackle connecting the opposite end of said spring to another portion of said frame, and a bearing adjacent to the point of rigid attachment having a cammed surface for limiting the deflection of said spring, and producing in the body portion of the spring substantially the same movement as with a pivotal connection at said point of attachment.

9. The combination with a vehicle frame, of a leaf spring for supporting the same, a shackle connecting the rear of said spring with said frame, the main leaf of said spring being provided with a forward extension, a cam block on said frame to which the forward end of said extension is rigidly attached, and a reinforcing spring leaf rigidly attached to said main leaf and cam block and extending upon the opposite side of the spring, said cam block and reinforcing leaf serving to limit the deflection of said main leaf, and said shackle permitting longitudinal movement of said spring.

10. The combination with a vehicle frame, of a supporting spring therefore, having an extension rigidly attached to said frame, and means adjacent to the point of rigid attachment and adapted to contact throughout the length of and on opposite sides of the spring for controlling the deflection of the extension within safe limits.

11. The combination with a vehicle frame of a supporting spring therefore, having an extension on the main leaf thereof, means for rigidly attaching the leaf extension to said frame and reinforcing means arranged on opposite sides of the said extension adjacent to the point of rigid attachment and extending throughout the length thereof for limiting the deflection of the spring.

12. The combination with a vehicle frame of a leaf spring for supporting the same, having an extension on the main leaf thereof, means for rigidly securing the end of said leaf extension to said frame, a bearing adjacent said main leaf having a cam face for limiting the deflection of said leaf in one direction and means associated with the bearing for limiting the deflection of the spring in the other direction.

13. The combination with a vehicle frame, of a supporting spring therefore, having one end rigidly attached to said frame, a shackle connecting the opposite end of said spring to another portion of said frame and a bearing adjacent to the point of rigid attachment having a pair of cammed surfaces for limiting the deflection of said spring.

In testimony whereof I affix my signature.

ALANSON P. BRUSH.